United States Patent
Schlotmann et al.

[15] 3,702,545
[45] Nov. 14, 1972

[54] SHAFT COUPLING HAVING RESILIENT TORQUE-TRANSMITTING MEMBER

[72] Inventors: Karl Schlotmann; Heinz-Dieter Bohm, both of Unna; Werner Ruggen, Holzwickede, all of Germany

[73] Assignee: Maschinenfabrik Stromag G.m.b.H., Unna, Germany

[22] Filed: June 5, 1970

[21] Appl. No.: 43,700

[30] Foreign Application Priority Data

June 11, 1969 Germany..........P 19 29 623.2

[52] U.S. Cl..................................64/11 R, 64/14
[51] Int. Cl.................................................F16d 3/19
[58] Field of Search..................................64/11, 14

[56] References Cited

UNITED STATES PATENTS

| | | |
|---|---|---|
| 3,137,149 | 6/1964 | Schlotmann...................64/11 |
| 3,020,737 | 2/1962 | Firth..............................64/11 |
| 2,901,896 | 9/1959 | Reich.............................64/11 |
| 3,178,906 | 4/1965 | Ricketts........................64/11 |

*Primary Examiner*—Kenneth W. Sprague
*Attorney*—Erwin Salzer

[57] ABSTRACT

A flexible coupling including a resilient torque-transmitting member having an axially inner portion substantially in the shape of a tire of a car and having lateral sleeve portions projection axially outwardly from the axially inner car-tire-shaped portion is provided with equidistant reinforcement inserts separated from each other by a layer of an elastomer.

4 Claims, 2 Drawing Figures

INVENTORS
Karl SCHLOTMANN
Heinz-Dieter BOHM
Werner PUGGEN

By [signature]

their ATTORNEY

SHAFT COUPLING HAVING RESILIENT TORQUE-TRANSMITTING MEMBER

BACKGROUND OF INVENTION

Prior art flexible couplings including a resilient torque-transmitting member having an axially inner portion substantially in the shape of a car tire and lateral sleeve portions projecting axially outwardly from the car-tire-shaped portion ares subject to a number of interrelated limitations and drawbacks. The outer diameter of the car-tire-shaped portion must be relatively large, i.e., generally four to five times the outer diameter of rigid flanges mounted on a pair of shafts to be coupled by the flexible coupling. In prior art flexible couplings of the aforementioned character the outer diameter of the axially inner car-tire-shaped portion of the resilient torque-transmitting member had to be as large as stated in order to achieve the desired, or required, torsional resiliency. The relatively large outer diameter of the axially inner car-tire-shaped portion of the torque-transmitting member tends to result in very bulky coupling structures. It further tends to result in large centrifugal forces, limiting the number of revolutions per minute at which such coupling may safely be applied.

The radially inner surfaces of the lateral sleeve portions of flexible couplings of the kind under consideration are provided with systems of axially extending gears interleaving with like systems of gears provided on the radially outer surfaces of the two rigid flanges mounted on a pair of shafts to be coupled. Circular clamping means or clamping rings mounted on the radially outer surfaces of the lateral sleeve portions of the resilient torque-transmitting member exert large radially inwardly directed pressures on said sleeve portions. These large pressures are required to maintain the radially inner gear systems of said sleeve portions in interleaving torque-transmitting engagement with the radially outer gear systems on the radially outer surfaces of said rigid flanges of the coupling. It is common practice to provide the aforementioned sleeve portions with heavy and thick inserts of a woven material to impart to them the mechanical strength required to withstand very high radial clamping pressures without being damaged by such pressures. Because of the presence of these heavy or stiff inserts, the sleeve portions of the torque-transmitting member have but little, or virtually no, torsional resiliency. Whatever torsional resiliency is required must be achieved by the size of the axially inner car-tire-shaped portion of the torque-transmitting member. Hence such large dimensions must be imparted to that portion of the torque-transmitting member as set forth above, resulting in the numerous drawbacks and limitations to which reference has been made.

The principal object of the present invention is to provide a flexible coupling of the above description which is not subject to the aforementioned drawbacks and limitations.

Another object of the present invention is to provide flexible couplings of the above description having uniform performance characteristics so that each individual coupling of a given type and size performs in exactly the same way as any other individual coupling of the same type and size.

SUMMARY OF THE INVENTION

According to this invention prior art couplings of the above description are greatly improved by the provision of woven reinforcing inserts in the axially inner car-tire-shaped portion and the lateral sleeve portions of the resilient torque-transmitting member, said reinforcement inserts being spaced equidistantly throughout the entire length thereof and separated from each other by an intermediate layer of a resilient material. The outer diameter of said car-tire-shaped portion is equal or smaller than twice the pitch diameter of the system of torque-transmitting teeth on said sleeve-shaped portion of the torque-transmitting member. In order to achieve optimal performance characteristics the volume of the reinforsement layers ought to be about 20 percent of the volume of the elastomer of which the torque-transmitting member is formed.

DESCRIPTION OF PREFERRED EMBODIMENTS

Figure 1:
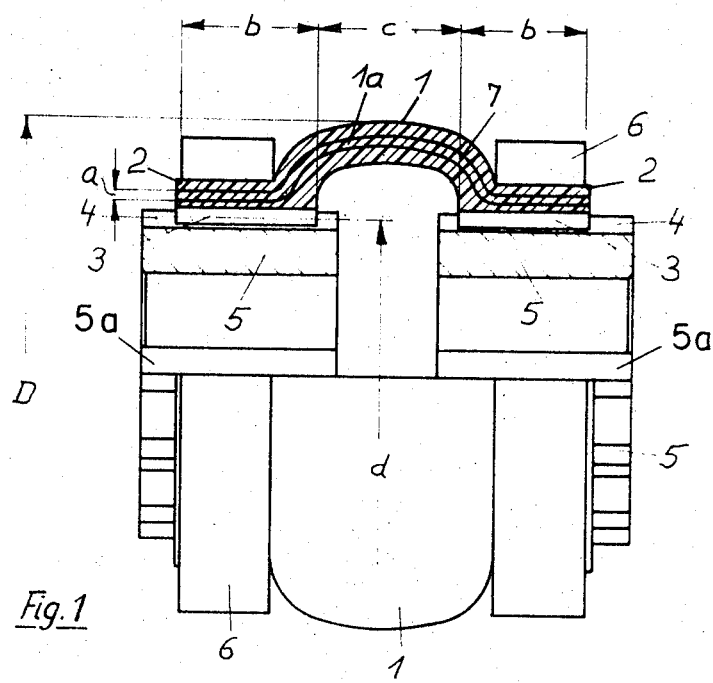
FIG. 1 is partly a vertical section of a flexible coupling embodying the present invention and partly a front elevation of the coupling.
Figure 2:
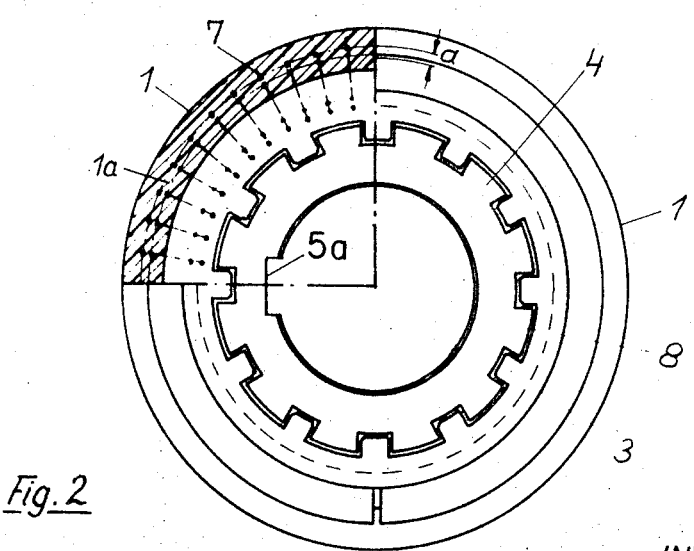
FIG. 2 shows the same structure as FIG. 1, three quadrants of FIG. 2 being end views of the structure and the fourth quadrant of FIG. 2 being a vertical section along the median plane of the structure.

The structure of FIGS. 1 and 2 is provided with a resilient torque-transmitting member having an axially inner portion 1 substantially in the shape of a car tire and lateral sleeve portions 2 projecting axially outwardly from the axially inner car-tire-shaped portion 1. The sleeve portions 2 are provided at the radially inner surfaces thereof with systems of straight gears 3 interleaving with systems of straight gears 4 provided on the radially outer surfaces of rigid coupling flanges or hub members 5. The latter are intended to be mounted on a pair of shafts to be coupled. These shafts are not shown in FIG. 1 and indicated in FIG. 2 by reference character 8. Each flange or hub member 5 is provided with a groove 5a extending in a direction longitudinally of the respective hub member 5 and intended to receive a key for torque-transmission from one of the shafts to one of the flanges or hub-members 5, and from the other flange or hub-member 5 to the other of the shafts. A clamping ring 6 is mounted on the radially outer surface of each of the sleeve portions 2 exerting a radially inward clamping pressure against sleeve portions 2, and thus firmly maintaining gear systems 3, 4 in interleaving torque-transmitting engagement.

The torque-transmitting member 1, 2 is provided with equidistantly spaced layers of a woven reinforcement insert 7. Reference character a has been applied to indicate the spacing between contiguous layers of insert 7. The latter may be a woven textile or a woven wire net. The spaces between contiguous layers of the insert 7 are filled by layers 1a of a resilient material. Layers 1a consist preferably of the same elastomer of which the other portions of torque-transmitting member 1, 2 are made. This facilitates the manufacture of torque-transmitting member 1, 2. The relative thickness of the spaced layers of the reinforcing insert 7 and of the intermediate layers 1a of an elastomer are of considerable importance for achieving best results. The volume of the reinforcement layers 7 should preferably be about 20 percent of the volume of the elastomer of which torque-transmitting member 1, 2 is formed.

Reference character $d$ has been applied to indicate the inner diameter and reference character D has been applied to indicate the outer diameter of torque-transmitting member 1, 2. The diameter $d$ is the pitch diameter of the systems of straight gear teeth 3, as clearly shown in FIG. 1. The coupling should comply with the condition $D \leqq 2d$. Preferably the diameter D should be about 1.6 to 1.8 times the diameter $d$. These critical dimensions make it possible to properly insert the spaced layers 7, at the same time minimizing the bulk of the coupling. The aforementioned ratio of the diameters 1$d$ and D calls for a sufficient axial length $b$ of the sleeve portions 2 to assure proper engagement of parts 2 and 5. To this end the axial length of sleeve portions 2 ought to be approximately equal to the axial length $c$ of the median or axially inner car-tire-shaped portion 1 of the torque-transmitting member 1, 2.

When a coupling according to the present invention is subjected to a load, flanges or hub members 5 are angularly displaced on account of the torsional resiliency of torque-transmitting member 1, 2. It torque-transmitting member 1,2 is subject to torsional forces, the spacing between the constituents layers of its multilayer reinforcement insert 7 is reduced and the intermediate elastic or elastomeric layers 1a are more or less displaced from the original, or non-stressed position. The larger in torques to be transmitted, the smaller the spacing under load between contiguous layers of the multi-layer insert 7.

The elastomer of which torque-transmitting member 1,2 is made may be rubber. As mentioned above, the manufacturing process of the torque-transmitting member 1,2 is simplified if the elastomer of which it is made is uniform. In some instances it may, however, be desirable to make the intermediate layers 1a between layers of the reinforcement insert 7 of an elastomer having other physical properties than the elastomer of which other portions of the torque-transmitting member 1, 2 are made. Thus the Shore-hardness of the intermediate layers 1a may be larger, or smaller, than that of the other portions of torque-transmitting member 1, 2 which are made of another elastomer.

Inserts 7 are spaced substantially equidistantly from the radially outer surface and the radially inner surface of the portion 1 and substantially equidistantly from the radially outer surfaces and the radially inner surfaces of portions 2 of the flexible coupling.

We claim as our invention:

1. A flexible coupling including an elastomeric torque-transmitting member having an axially inner portion substantially in the shape of a tire of a car, and having lateral sleeve portions projecting axially outwardly from the car-tire-shaped portion and being provided with systems of axially extending torque-transmitting gears on the radially inner surfaces thereof wherein
   a. the outer diameter D of said axially inner car-time-shaped portion and the pitch diameter d of said systems of torque-transmitting teeth are related by the inequality
   $$D \leqq 2d;$$
   b. said axially inner car-tire-shaped portion and said lateral sleeve portions are provided with woven reinforcement inserts equidistantly spaced throughout the entire length thereof and separated from each other by an intermediate layer of an elastomeric material; and wherein
   c. the volume of said woven reinforcement inserts is in the order of 20 percent of the volume of the elastomer of which said torque-transmitting member is formed.

2. A flexible coupling as specified in claim 1 wherein said reinforcement inserts are spaced substantially equidistantly from the radially outer surface and from the radially inner surface of said car-tire-shaped portion and from the radially outer surfaces and from the radially inner surfaces of said lateral sleeve portions.

3. A flexible coupling as specified in claim 1 complying with the condition $$D = 1.6d \text{ to } 1.8d$$

wherein D is the outer diameter of said car-tire-shaped portion and $d$ is the pitch diameter of said systems of torque-transmitting teeth.

4. A flexible coupling as specified in claim 3 wherein the axial length of said car-tire-shaped portion and the axial lengths of each said lateral sleeve portions are substantially equal.

* * * * *